Oct. 14, 1969  J. PICKLES  3,472,551
TOP LIFT SLAVE ASSEMBLY
Filed Nov. 16, 1967  2 Sheets-Sheet 1

INVENTOR
JOSEPH PICKLES
BY Whittemore, Hulbert & Belknap
ATTORNEYS

Oct. 14, 1969　　　J. PICKLES　　　3,472,551
TOP LIFT SLAVE ASSEMBLY
Filed Nov. 16, 1967　　　　　　2 Sheets-Sheet 2

INVENTOR
JOSEPH PICKLES
BY
ATTORNEYS

United States Patent Office 3,472,551
Patented Oct. 14, 1969

3,472,551
TOP LIFT SLAVE ASSEMBLY
Joseph Pickles, Bloomfield Hills, Mich., assignor to Ferro Manufacturing Corporation, Detroit, Mich., a corporation of Michigan
Filed Nov. 16, 1967, Ser. No. 683,729
Int. Cl. B60j 7/12
U.S. Cl. 296—117                                    13 Claims

ABSTRACT OF THE DISCLOSURE

A folding top pivot mounting and actuating assembly comprising a bracket for attachment to the vehicle frame, an arm pivoted directly to said bracket for rigid connection to the rear side rail sections of the top structure and constituting the pivot mounting therefor, a pivot connection on said bracket for an actuating link for connection to the folding top, and planetary gearing connected between the bracket and arm.

FIELD OF THE INVENTION

The invention is in the field of folding or convertible fabric tops for automobiles.

In this field, the forces required to effect power actuated folding or extension of the top are considerable and it is desirable to confine the reaction to these forces with an integrated mounting and power assembly so as to avoid applying such forces to the vehicle frame.

SUMMARY OF THE INVENTION

In the present invention planetary gearing is used to apply power to an arm which is the principal support for the folding top. The gearing includes a gear fixed to the arm in concentric relation to the pivot axis thereof. The actuating and mounting assembly includes a bracket having means for connection to an actuating link connected to the folding top structure so that upon swinging movement of the principal supporting arm, the link operates on the various links and levers of the folding top structure so as to cause it to extend forwardly into operative position, or to fold into a collapsed position as it is swung rearwardly to its housed position.

More specifically, the gearing which applies the forces necessary to swing the main supporting arm include an internal gear. A rotatable sun gear is carried by the bracket concentric to the internal gear and having its teeth spaced substantially from the teeth of the internal gear. The arm which supports and swings the folding top has a spider fixed thereto carrying a plurality of pinions which mesh both with the internal gear and with the sun gear. Accordingly, as the sun gear is rotated relatively great forces are available to swing the arm and the folding top structure carried thereby. The rotatable sun gear has a worm gear fixedly connected thereto and a worm is employed for imparting rotation to the worm gear.

It will of course be understood that similar slave assemblies are provided at opposite sides of the vehicle and the driving worms thereof are connected to a suitable source of power such as an electric motor, through flexible drive cables. The mechanical advantage obtained from the worm and worm gear combination and the planetary or epicyclic gear assembly is relatively great so that the considerable forces required to effect extension and folding of the top may be available and at the same time these forces are all contained within the unitary mounting and actuating assembly and are isolated thereby from frame parts of the motor vehicle.

It is an object of the present invention to provide a folding top pivot mounting and actuating assembly as described in the foregoing.

Other objects and features of the invention will become apparent as the description proceeds, especially when taken in conjunction with the accompanying drawing, illustrating a preferred embodiment of the invention.

DESCRIPTION OF THE PREFERRED EMBODIMENT

Figure 1:
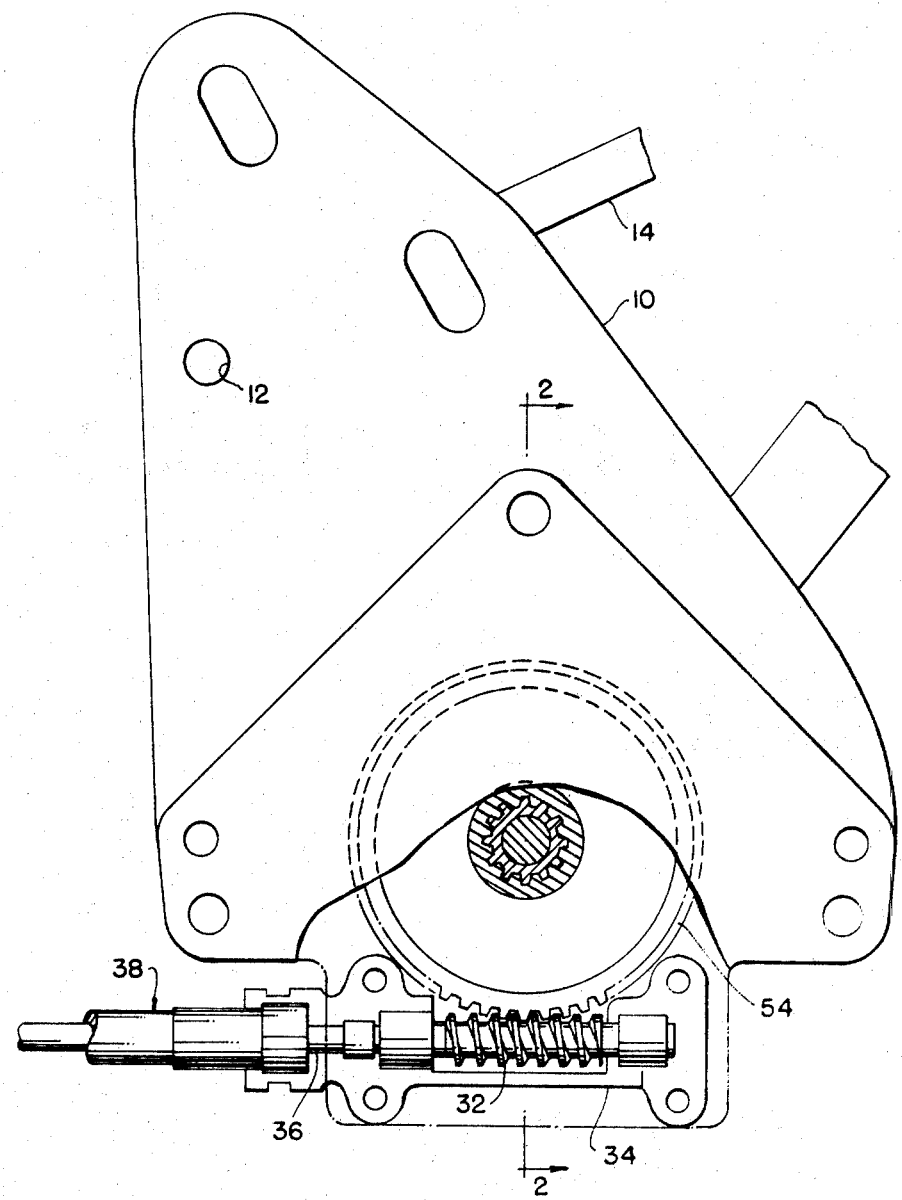
FIGURE 1 is an elevational view of the assembly with parts broken away.

The assembly comprises a relatively large rigid mounting bracket 10 provided with an opening 12 for the connection of a balance link 14. One end of the bracket 10 is shaped to provide a cup 15 having a bottom wall 16 and a cylindrical side wall 18, a portion of the side wall being cut away as indicated at 20 for the reception of an actuating worm as will subsequently be described. The bottom wall 16 has a relatively large opening therein shaped to form an internal gear 21. Fixedly secured to the bracket 10 is a plate 22 having an opening 24 which receives a shaft or stud 26, one end of which is threaded as indicated at 28 and which is clamped to the plate 22 by means such as the nut 30. Also carried by the plate 22 is a driving worm 32, the worm being carried by a mounting 34 bolted or otherwise secured to the plate 22, and the worm 32 is connected to the driving element 36 of a flexible drive cable indicated generally at 38.

An arm 40 is provided, one end of which is enlarged and shaped to form a cup 41 having a cylindrically formed side wall 42 and a bottom wall 44. The other end of arm 40 is rigidly connected to the rear side rail of the usual folding top construction, or arm 40 may be considered as a part of the rail. The side wall 42 is shaped to fit closely over the side wall 18 of the cup portion of the bracket 10 so that it is guided for rotation thereon and is adequately supported as a result of the substantial size of the bearing assembly formed by the cylindrically shaped side walls or flanges 18 and 42. The cup 41 is retained in the assembled relationship illustrated in FIGURE 2 by a head 46 provided on the shaft 26. A tubular sleeve 48 is rotatable on the shaft 26 and serves as means for spacing the cup 41 in predetermined relation from the plate 22. The sleeve 48 is provided with a sun gear 50 and with splines 52 which fix a worm gear 54 to the sleeve 48 for rotation therewith. The worm gear 54 is in mesh with the worm 32.

Figure 2:
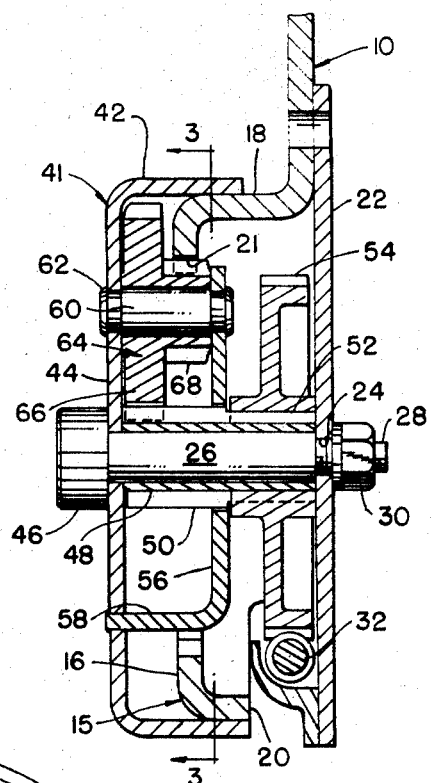
FIGURE 2 is a sectional view on the line 2—2, FIGURE 1.
Figure 3:
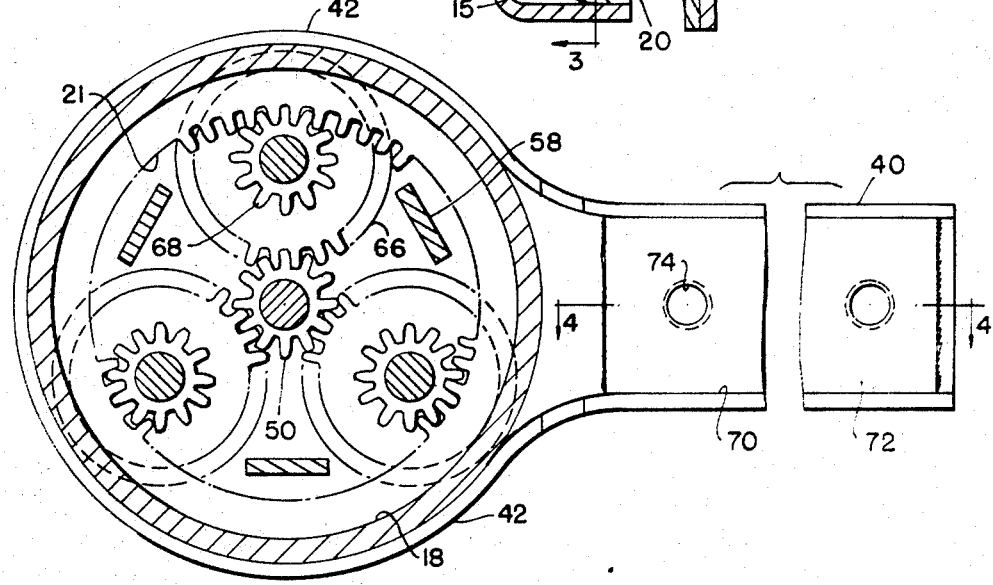
FIGURE 3 is a sectional view on the line 3—3, FIGURE 2.
Figure 4:
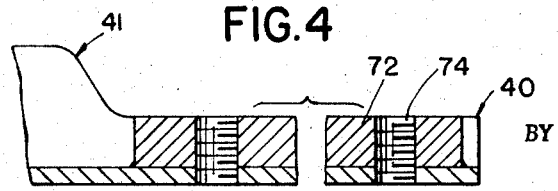
FIGURE 4 is a sectional view on the line 4—4 FIGURE 3.

Fixed to the cup 41 is a spider 56 having a plurality, as for example three, arms 58 which extend through slots in the bottom wall 44 of the cup 41 and which are peened over or otherwise fixed thereto as illustrated in FIGURE 2. Extending between the spider 56 and the bottom wall 44 of the cup 41 are a plurality, as for example three, pivot pins 60 the ends of which extend through openings in the spider 56 and wall 44 and are upset as indicated at 62. Mounted on the pins 60 are planetary pinions indicated generally at 64 and including relatively large pinion portions 66 which are in mesh with the sun gear 50, and relatively small pinions 68 which are in mesh with the internal gear 21.

The arm 40 is relatively elongated and is adapted to be secured rigidly to the folding top structure and more particularly, to the rear side rail of a conventional folding top. In order to provide adequate strength the arm 40 is shaped with side flanges 70 defining a channel therebetween in which is welded or otherwise secured a reinforcing bar 72. Threaded openings 74 are provided for attachment to the folding top structure.

From the foregoing description it will be apparent that rotation of the worm 32 will effect a swinging movement of the arm 40 and the entire folding top structure connected thereto. This movement of the folding top structure is caused to produce folding or extension thereof by a suitable connection to the balance link 14 which is pivoted to the stationary bracket 10. Accordingly, all forces developed in operating the folding top are contained within the pivot mounting and actuating assembly as described in the foregoing.

The drawings and the foregoing specification constitute a description of the improved top lift slave assembly in such full, clear, concise and exact terms as to enable any person skilled in the art to practice the invention, the scope of which is indicated by the appended claims.

What I claim as my invention is:

1. Folding top pivot mounting and actuating assembly constituting the main pivot for the folding top and the means for swinging the rear side roof top rail between folded and extended positions, said assembly including a rigid mounting bracket having pivot mounting means thereon, a link pivotally connected at one end to said pivot mounting means for connection to the folding top structure to provide for folding or extension thereof on swinging movement of said rail, an arm pivoted at one end to said bracket at a point remote from said pivot mounting means and adapted to be rigidly connected to said rail to constitute the main pivot mounting for the entire folding top, and planetary gearing connected directly between said bracket and arm for swinging said arm, said gearing including an internal gear fixed to said bracket, said arm having its pivoted end cupped and including a flat plate portion surrounding its pivot axis, a spider fixedly connected to said arm having a flat plate portion spaced laterally from the flat plate portion of said arm, a plurality of planetary pinions carried between said flat plate portions and located within said cupped portion of said arm, an elongated support on the axis of said pivot mounting rotatably connected to said bracket and arm, a sun gear fixed to said support, said pinions being in mesh with said sun gear and with said internal gear, and means for driving said support in rotation.

2. An assembly as defined in claim 1 in which said power mechanism comprises an input worm and a worm gear driven thereby.

3. Folding top pivot mounting and actuating assembly constituting the main pivot for the folding top and the means for swinging the rear side roof top rail between folded and extended positions, said assembly including a rigid mounting bracket having pivot mounting means thereon, a link pivotally connected at one end to said pivot mounting means for connection to the folding top structure to provide for folding or extension thereof on swinging movement of said rail, an arm pivoted to said bracket at a point remote from said pivot mounting means aand adapted to be rigidly connected to said rail to constitute the main pivot mounting for the entire folding top, and power mechanism connected directly between said bracket and arm for swinging said arm, said bracket having a cylindrical cupped portion constituting a bearing for said arm.

4. An assembly as defined in claim 3, said arm having a cupped cylindrical portion having a flange rotatably supported by the cupped portion of said bracket.

5. An assembly as defined in claim 4, a plate closing the open side of the cupped portion of said bracket, a shaft on said support located on said pivot axis, said elongated support comprising a sleeve rotatable on said shaft.

6. An assembly as defined in claim 3, said internal gear being formed in the bottom wall of the cupped portion of said bracket.

7. An assembly as defined in claim 6, said arm having a cupped portion pivotally connected to the cupped portion of said bracket, said spider being located within the cup portion of said arm.

8. An assembly as defined in claim 3, the means for driving said support in rotation comprising a worm gear fixed thereto, and a worm in mesh with said worm gear and carried by said bracket.

9. A top lift drive assembly comprising a mounting bracket having a cylindrical cupped portion, the bottom wall of which has an opening shaped to form an internal gear concentric with said cupped portion, said bracket comprising a closure plate secured over the open side of said cupped portion, a shaft fixed to said plate on the axis of said cupped portion and said internal gear, a sleeve rotatable on said shaft, a worm gear fixed to said sleeve within the cupped portion of said bracket, an arm having a cylindrical cupped portion at one end rotatably supported by the cupped portion of said bracket, a spider fixed to the cupped portion of said arm, pinions rotatably carried between said spider and said arm and having portions in mesh with the internal gear, a sun gear fixed to said sleeve, said pinions having portions in mesh with said sun gear, and a worm carried by said bracket in mesh with said worm gear.

10. An assembly as defined in claim 9 in which the cupped portion of said arm has a cylindrically formed flange rotatably engaging over the cylindrically cupped portion of said bracket.

11. An assembly as defined in claim 10 in which said shaft extends through the bottom wall of the cupped portion of said arm and has a head retaining the arm against separation from said bracket while providing for rotation thereof.

12. A top lift drive assembly comprising a mounting bracket having a cylindrical cupped portion the bottom wall of which has an opening shaped to form an internal gear concentric with said cupped portion, said bracket comprising a closure plate secured over the open side of said closure plate, an arm having a cupped portion including a cylindrically formed wall portion rotatably supported by the cylindrical cupped portion of the bracket, the cupped portion of the arm having a bottom wall spaced from the bottom wall of the cupped portion of the bracket, a spider fixedly secured to the cupped portion of said arm and extending through the opening in the bottom wall of the cupped portion of the bracket, a shaft extending from the closure plate through the opening in the bottom wall of the cupped portion of said bracket to the bottom wall of the cupped portion of said arm and retaining said arm assembled to said bracket, a worm gear and a sun gear mounted on said shaft for conjoint rotation, pinions carried between said spider and the bottom wall of the cupped portion of said arm, said pinions having portions in mesh with said sun gear and portions in mesh with said internal gear, and a driving worm carried by said bracket and in mesh with said worm gear.

13. A top lift drive assembly comprising a mounting bracket having a cylindrical cupped portion the bottom wall of which has an opening shaped to form an internal gear concentric with said cupped portion, an arm having a cylindrical cupped portion rotatably supported by the cupped portion of said bracket, a sun gear rotatably carried by said bracket, and rotatable pinions mounted in fixed position in the cupped portion of said arm and meshed with said sun gear and said internal gear.

References Cited

UNITED STATES PATENTS

| | | | |
|---|---|---|---|
| 2,439,521 | 4/1948 | Miller | 74—421 |
| 2,710,223 | 6/1955 | Vigmostad | 296—117 |
| 3,265,362 | 8/1966 | Moody | 74—801 |

BENJAMIN HERSH, Primary Examiner

R. S. SONG, Assistant Examiner